United States Patent [19]

Remmers et al.

[11] 4,141,603
[45] Feb. 27, 1979

[54] ROTATION-INSENSITIVE SPIRAL GROOVE BEARING

[75] Inventors: Gerrit Remmers; Leonardus P. M. Tielemans, both of Eindhoven, Netherlands

[73] Assignee: U.S. Philips Corporation, New York, N.Y.

[21] Appl. No.: 824,503

[22] Filed: Aug. 15, 1977

[30] Foreign Application Priority Data

Sep. 3, 1976 [NL] Netherlands .......................... 7609817

[51] Int. Cl.$^2$ ............................................ F16C 32/06
[52] U.S. Cl. ......................................... 308/9; 308/98; 308/108; 308/121; 308/122; 308/168
[58] Field of Search .................... 308/9, 78, 79, 92, 93, 308/96, 97, 98, 100, 108, 121, 122, 170, 168, 240, DIG. 1

[56] References Cited

U.S. PATENT DOCUMENTS

| 3,238,000 | 3/1966 | Muijderman et al. | 308/121 |
| 3,511,546 | 5/1970 | Muijderman | 308/121 |
| 3,517,973 | 6/1970 | Hirs | 308/122 |
| 3,602,555 | 8/1971 | Hendler | 308/9 |
| 4,007,974 | 2/1977 | Huber | 308/9 |

Primary Examiner—Charles E. Frankfort
Attorney, Agent, or Firm—David R. Treacy

[57] ABSTRACT

A bearing having two parts which are rotatable relative to each other, and two facing bearing surfaces on the respective parts cooperating with each other. One or both surfaces are provided with three patterns of shallow, parallel lubricant pumping grooves, the two outer patterns having grooves which have a pumping effect in the same direction, and the inner pattern having grooves which have a pump effect in the opposite direction.

6 Claims, 9 Drawing Figures b a

ROTATION-INSENSITIVE SPIRAL GROOVE BEARING

BACKGROUND OF THE INVENTION

The invention relates to a bearing comprising two parts which are rotatable relative to each other, and having facing bearing surfaces which cooperate with each other on the respective parts, one or both surfaces including one or more patterns of shallow, parallel lubricant pumping grooves.

A bearing of the kind which is the subject of the present invention is known from British Patent Specification No. 1,068,448. This known bearing is an axial bearing suitable for two directions of rotation, because the cooperating bearing surfaces are provided with two patterns of grooves, one pattern having a pumping effect in the case of rotation in one direction, and the other pattern having a pumping effect upon rotation in the other direction. The patterns therein are separated from each other by a zone in which lubricant is supplied for one of the patterns of grooves. When lubricant is continuously supplied to the patterns, this bearing is very suitable for two directions of rotation, but if the bearing is not relubricated, as for example when the bearing is filled once with grease, this bearing will discharge all of its lubricant after a very brief period of time, so that further operation is not possible.

A radial bearing having two patterns of grooves on the cooperating surfaces is known from United States Patent Specification No. 3,467,449 and British Patent Specification No. 1,022,391. Therein, the two patterns of grooves pump against each other in one direction of rotation, so that pressure is built up. Rotation in the other direction is not permissible, because no pumping action occurs and hence no pressure is built up.

SUMMARY OF THE INVENTION

The invention has for its object to provide a spiral groove bearing of the kind described which is suitable for two directions of rotation, which has a simpler construction and in which less leakage of lubricant occurs than in the known bearings for two directions of rotation.

To this end, a bearing in accordance with the invention comprises three adjoining patterns of pumping grooves, the two outer patterns consisting of grooves which have a pumping effect in the same direction, the inner pattern comprising grooves which pump in the opposite direction.

In the bearing in accordance with the invention, upon rotation in the one direction, the lubricant will be forced in the one outer pattern of grooves and the inner pattern of grooves, these two patterns then cooperating as a herringbone pattern, while the other outer pattern is drained, part of the lubricant present therein reaching the inner pattern, and part being pumped to the outside.

Upon rotation in the other direction, the inner and the other outer pattern will cooperate as a herringbone pattern, the one outer pattern then pumping itself empty. In this bearing, lubricant need be supplied only on the two outer sides of the outer patterns. Structurally difficult lubricant supply facilities between the patterns can be dispensed with.

Even though the bearing is very well suited to bi-directional rotation, it can also be used for shafts which normally rotate in one direction only. When use is made of the bearing in accordance with the invention, the ultimate direction of rotation need not be taken into account during assembly.

In order to enhance the hydrodynamic bearing power, in a further embodiment of the bearing in accordance with the invention the inner pattern of grooves is subdivided into two parts between which a bearing surface without grooves is disposed.

If flushing of the bearing with lubricant at regular intervals is desired, for example, for cooling or the discharge of dirt particles, this can be simply realized in accordance with the invention by imparting a stronger pumping action to the two outer patterns of grooves than to the inner pattern. A stronger pumping action can then be obtained by choosing the length of the groove pattern to be larger or by variation of the groove depth or the groove width.

As has already been stated, the bearing in accordance with the invention is particularly suitable for grease lubrication. When the direction rotation is reversed, the grease is shifted more or less in the groove patterns and only a small part of the total grease content is pumped outside.

In order to retain this discharged grease on the exit sides of the outer patterns as much as possible, in a further embodiment of the bearing in accordance with the invention the outer patterns are provided on their outer side with a lubricant reservoir which is accommodated in one of the two surfaces. The grease is retained in these lubricant reservoirs by the surface tension.

In order to counteract leakage of lubricant from these lubricant reservoirs, the parts of the bearing surfaces of a still further preferred embodiment of the device, which bound the lubricant reservoirs on the side which is remote from the groove patterns have a further pattern of grooves whose pumping action opposes that of the pattern situated on the other side of the respective reservoir.

The invention will be described in detail hereinafter with reference to the diagrammatic drawing which is not to scale and which illustrates a number of embodiments of bearings in accordance with the invention.

DESCRIPTION OF THE PREFERRED EMBODIMENTS

Figure 1:
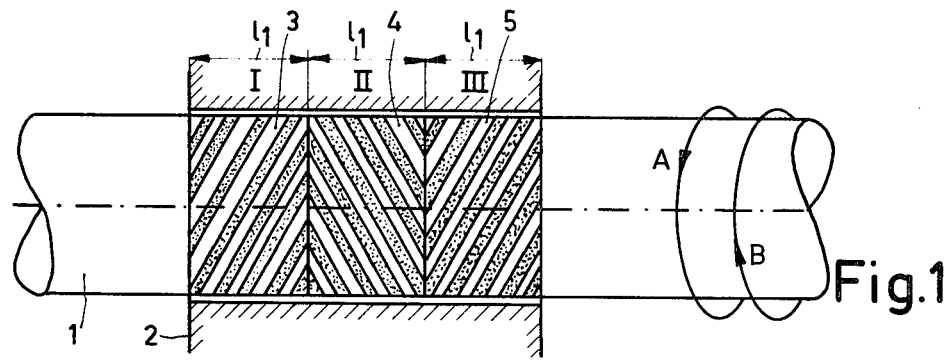
FIG. 1 is a diagrammatic view of a radial bearing comprising three patterns of grooves.

FIG. 1 diagrammatically shows a radial bearing with a shaft 1 and a bearing housing 2. The shaft 1 is provided with three adjoining patterns 3, 4 and 5 of shallow lubricant pumping grooves. The grooves of the outer patterns 3 and 5 extend so that these patterns pump the lubricant in the same direction, while the grooves of the inner pattern 4 extend so that this pattern pumps in the opposite direction.

When the shaft 1 rotates in the direction of the arrow A, the patterns 3 and 4 pump the lubricant towards each other, so that a hydrodynamic pressure occurs in the lubricant at this area. In this direction of rotation, the pattern 5 pumps itself empty, part of the lubricant reaching the pattern 4 while the remainder is pumped outside.

When the direction of rotation is reversed, i.e. rotation in the direction of the arrow B, the pumping directions are also reversed, so that the patterns 4 and 5 pump against each other, and the pattern 3 pumps itself empty.

Pressure then prevails in the lubricant at the area of the patterns 4 and 5.

Thus a build-up of pressure in the lubricant is ensured for both directions of rotation of the shaft 1. Upon reversal of the direction of rotation, this lubricant travels more or less from the one set of patterns 3, 4 to the other active set of patterns 4,5.

Figure 2:
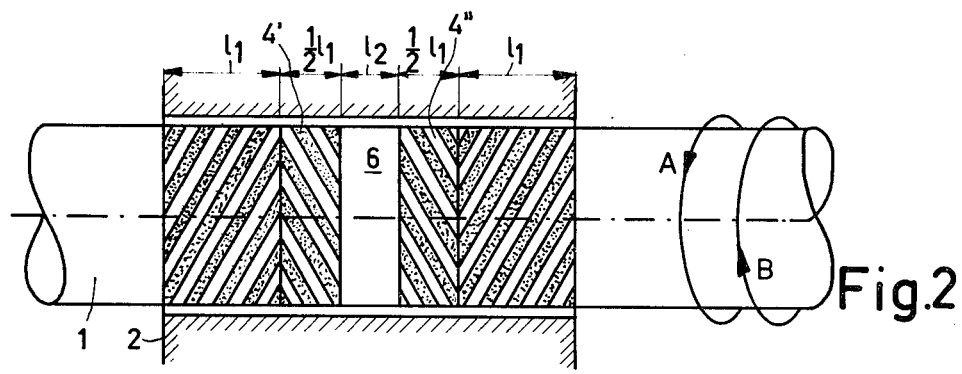
FIG. 2 similarly shows a radial bearing comprising three patterns of grooves, the central pattern of grooves being subdivided into two parts between which is disposed a bearing part without grooves.

In order to increase the bearing power, the central pattern 4 may be subdivided, as shown in FIG. 2, into two parts 4' and 4" each having a complete circumferential set of grooves between which a bearing part 6 without grooves is situated. The effect then remains the same.

Figure 3:
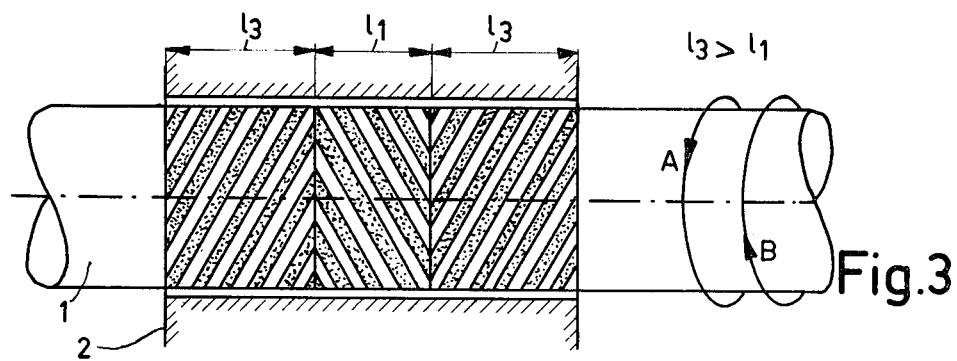
FIG. 3 shows a radial bearing comprising three patterns of grooves, the outer patterns having a stronger pumping action than the central pattern.

FIG. 3 shows a bearing in which the outer patterns of grooves 3 and 5 have a greater length, and therefore a greater pumping effect, than the central pattern 4. As a result, in each direction of rotation either the pattern 3 or the pattern 5 pumps more lubricant in the one direction than the central pattern pumps in the opposite direction. Consequently, the bearing is continuously flushed with lubricant in both directions of rotation. This may be advantageous, for example, for cooling or removal of dirt or other undesirable particles.

Figure 4:
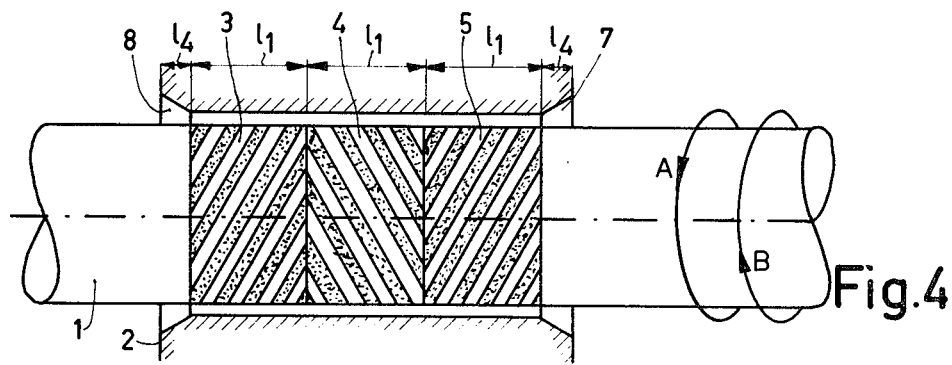
FIG. 4 shows a radial bearing comprising patterns of grooves, the outer patterns of grooves being provided with a lubricant reservoir on their entrance side.

When grease is used as the lubricant, grooves forming lubricant reservoirs 7 and 8 can be provided on the entrance sides of the patterns 3 and 5 as shown in FIG. 4, the discharged grease being temporarily stored in the reservoirs. It wil be obvious that for a given direction of rotation, the grease will collect in one of the two reservoirs, while upon rotation in the other direction, the grease will be displaced to the other reservoir.

The bearing usually contains excess grease. Even though all three patterns have the same length, small differences in pumping action may still occur, for example, due to manufacturing inaccuracies. If it is to be ensured that the excess grease will reach one of the two reservoirs 7 or 8, a stronger pumping action may be deliberately imparted to one of the two outer patterns.

Figure 5:
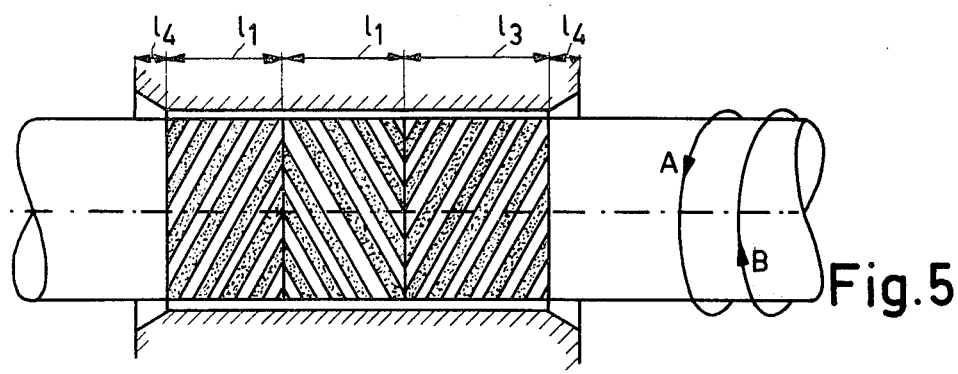
FIG. 5 shows a bearing as shown in FIG. 4, in which one of the outer patterns of grooves has a stronger pumping action than the other two patterns.

The pumping action (length) of the pattern 5 in FIG. 5 is greater than that of the pattern 3, so that the excess grease will be stored in the reservoir 8.

Figure 6:
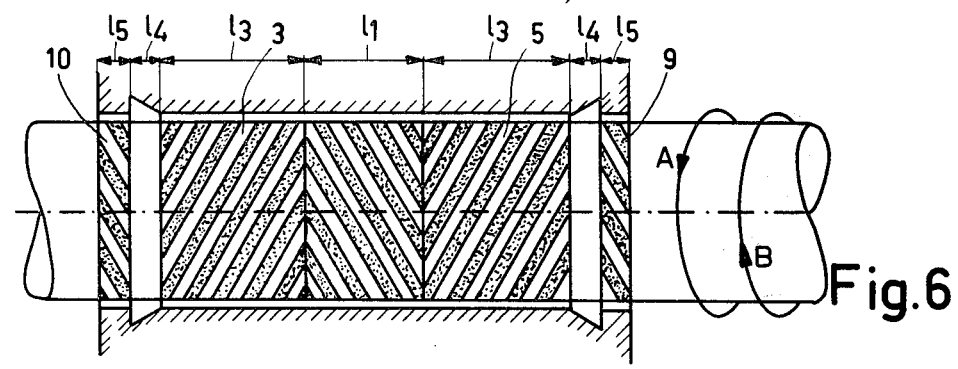
FIG. 6 shows a bearing as shown in FIG. 4, in which the outer side of each of the lubricant reservoirs is bounded by a pattern of further, sealing pumping grooves.

As an additional precaution against leakage of grease from the reservoirs 7 and 8, a further pattern of grooves 9, 10 is provided on the outer sides of the reservoirs 7 and 8 of the embodiment shown in FIG. 6, this pattern having a pumping action in the same direction as the adjoining groove patterns 5 and 3, respectively.

Thus, a radial bearing is obtained which can rotate in two directions and in which, when the direction of rotation is reversed, a given quantity of lubricant sides axially through the bearing to the patterns which ensure that pressure is built up in the lubricant in the relevant direction of rotation.

Figure 7:
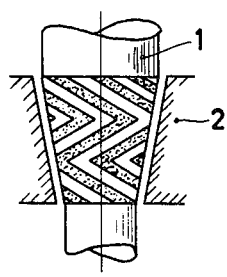
FIGS. 7, 8 and 9 diagrammatically show a conical continuous, a spherical continuous and a continuous axial bearing, respectively comprising three patterns.
Figure 8:
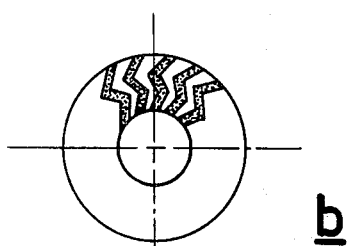
Figure 8:
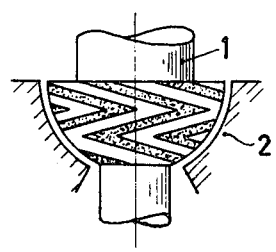
Figure 9:
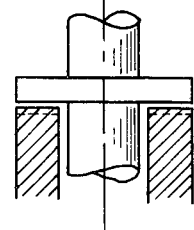

The invention has been described with reference to a radial bearing, but can be used equally well for the conical bearing with continuous shaft shown in FIG. 7, the spherical bearing wth continuous shaft shown in FIG. 8, and in an axial continuous bearing as shown in FIG. 9. The operation of these bearings is based on the same considerations.

In each of the foregoing embodiments the patterns of grooves are provided in the rotatable shaft. However, the grooves can be provided equally well in the sleeve or partly on the shaft and partly in the sleeve.

What is claimed is:

1. A rotation-insensitive spiral groove bearing having two parts rotatable relative to each other, and two bearing surfaces on the respective parts facing each other, at least one of said surfaces having at least one groove arrangement consisting of a plurality of groove patterns, each pattern having a multiplicity of shallow parallel lubricant pumping grooves, wherein said one surface has three only adjoining groove patterns, the outer groove patterns having a pumping effect in a same first direction, and the inner pattern therebetween having a pumping effect in a second direction opposite said first direction the groove patterns thus providing for lubrication of the facing bearing surfaces with relative rotation in either of two opposite directions.

2. A bearing as claimed in claim 1, providing lubricant flushing, wherein at least one of said outer patterns has a greater pumping effect than the inner pattern.

3. A bi-rotation bearing as claimed in claim 2, providing lubricant flushing for each direction of rotation, wherein each of said outer patterns has a greater pumping effect than the inner pattern.

4. A rotation-insensitive spiral groove bearing having two parts rotatable relative to each other, and two bearing surfaces in the respective parts facing each other, at least one of said surfaces having at least one groove arrangement of a plurality of groove patterns, each pattern having shallow parallel lubricant pumping grooves, wherein said bearing has a total of three only adjoining groove patterns; the outer groove patterns have a pumping effect in a same first direction, at least one of said parts having a grove adjoining an outer edge of an outer pattern to form a lubricant reservoir effective for storing lubricant when said first direction is toward said reservoir; and the inner pattern has a pumping effect in a second direction opposite said first direction the groove patterns thus providing for lubrication of the facing bearing surfaces with relative rotation in either of two opposite directions.

5. A bearing as claimed in claim 4, wherein a lubricant reservoir groove is arranged adjoining the outer edge of each outer pattern, and the bearing comprises two additional groove patterns spaced respectively outwardly from said outer groove patterns and said reservoir grooves and adjacent said reservoir grooves, said additional groove patterns having a pumping effect in said second direction.

6. A rotation-insensitive spiral groove bearing having two parts rotatable relative to each other, and two bearing surfaces on the respective parts facing each other, at least one of said surfaces having at least one groove arrangement of a plurality of groove patterns, each pattern having shallow parallel lubricant pumping grooves,
wherein said bearing has three only adjoining groove patterns, the outer groove patterns consisting of groves having a pumping effect in a same first direction; and the inner groove pattern consisting of two parts, each having a complete circumferential set of grooves between which an ungrooved bearing surface is disposed, each of said circumferential sets of grooves having a pumping effect in a second direction opposite said first direction, the groove patterns thus providing for lubrication of the facing bearing surfaces with relative rotation in either of two opposite directions.

* * * * *